United States Patent [19]
Kim

[11] Patent Number: 5,905,491
[45] Date of Patent: May 18, 1999

[54] DISPLAY MONITOR POWER SUPPLY APPARATUS WITH A POWER FACTOR CORRECTION CIRCUIT

[75] Inventor: Hong-Ki Kim, Kyungki-do, Rep. of Korea

[73] Assignee: SamSung Electronics Co., Ltd., Suwon, Rep. of Korea

[21] Appl. No.: 08/829,677

[22] Filed: Mar. 31, 1997

[30] Foreign Application Priority Data

Mar. 29, 1996 [KR] Rep. of Korea ......................... 96-9317

[51] Int. Cl.$^6$ ....................................................... G09G 5/00
[52] U.S. Cl. ........................ 345/212; 363/41; 395/750.04
[58] Field of Search ................................ 345/10, 11, 211, 345/212, 213; 395/750.03, 750.04, 750.08; 363/41, 21, 95, 97

[56] References Cited

U.S. PATENT DOCUMENTS

| | | | |
|---|---|---|---|
| 4,669,036 | 5/1987 | Cowett, Jr. ................................. | 363/21 |
| 4,886,979 | 12/1989 | Chang . | |
| 5,019,717 | 5/1991 | McCurry et al. . | |
| 5,335,168 | 8/1994 | Walker . | |
| 5,375,245 | 12/1994 | Solhjell et al. . | |
| 5,481,730 | 1/1996 | Brown et al. . | |
| 5,481,732 | 1/1996 | Shahbazi . | |
| 5,483,464 | 1/1996 | Song ..................................... | 364/492 |
| 5,734,562 | 3/1998 | Redl ........................................ | 363/16 |

Primary Examiner—Steven J. Saras
Assistant Examiner—John G. Lim
Attorney, Agent, or Firm—Robert E. Bushnell, Esq.

[57] ABSTRACT

A power supply apparatus for a display monitor includes a power factor correction circuit coupled to receive a primary voltage, for correcting a power factor of said primary voltage and generating a secondary voltage; a switch operable in response to a pulse signal; a switch control circuit for generating said pulse signal; a transformer including a primary winding and secondary windings connected to each other by mutual induction, in which the primary winding has a first terminal coupled to receive the secondary voltage and a second terminal connected to the switch, and in which the transformer is being supplied with primary induced voltage when the pulse signal has a primary duty ratio and supplied with secondary induced voltage lower than the primary induced voltage when the pulse signal has a secondary duty ratio; a rectifier for rectifying the primary and secondary induced voltages; and a smoothing circuit for smoothing an output voltage of the rectifier for application to the power factor correction circuit.

4 Claims, 3 Drawing Sheets

DISPLAY MONITOR POWER SUPPLY APPARATUS WITH A POWER FACTOR CORRECTION CIRCUIT

CLAIM FOR PRIORITY

This application makes reference to, incorporates the same herein, and claims all benefits accruing under 35 U.S.C. §119 from an application for *A Display Monitor Power Supply Apparatus With A Power Factor Correction Circuit* earlier filed in the Korean Industrial Property Office on Mar. 29, 1996, and there duly assigned Ser. No. 96-9317.

BACKGROUND OF THE INVENTION

1. Technical Field

The present invention relates to a power supply apparatus for display monitors, and more particularly, relates to a power supply apparatus having a simplified power factor correction circuit incorporated therein for display monitors in computer systems.

2. Related Art

Generally, power supplies for display monitors such as cathode ray tube (CRT) monitors commonly used with computer systems are designed to provide the necessary voltages and currents within the desired specifications using internal control. A typical computer-controlled power supply for use in computer systems includes an AC line rectification, AC loop regulation and power factor correction as disclosed in U.S. Pat. No. 5,019,717 for *Computer-Controlled Uninterruptable Power Supply* issued to McCurry et al. Some power supply systems may include power saving circuitry to reduce power consumption such as disclosed in U.S. Pat. No. 5,335,168 for *Computer System With Power-Down Mode For Monitor* issued to Walker, U.S. Pat. No. 5,375,245 for *Apparatus For Automatically Reducing The Power Consumption Of A CRT Computer Monitor* issued to Solhjell et al., and U.S. Pat. No. 5,481,730 for *Monitoring And Control Of Power Supply Functions Using A Microcontroller* issued to Brown et al. Other designs may include special circuitry to eliminate interferences such as disclosed in U.S. Pat. No. 4,886,979 for *Power Source Circuit Device For Monitors And Host Computers* issued to Chang, and hazard prevention circuitry to prevent hardware power failure such as disclosed in U.S. Pat. No. 5,481,732 for *CRT Monitor Power Control Circuit* issued to Shahbazi.

Typically, the power supply system is provided with a power-off circuit for interrupting the electrical power supply to the monitor during a power off. In many systems however, power regulation need to be improved because the output power voltage fluctuates as a function of input voltage as well as a load variation. Moreover, additional display power management signaling control circuit is necessarily required to support the power factor correction. Accordingly, further improvement in the power supply circuit design can be contemplated.

SUMMARY OF THE INVENTION

Accordingly, it is therefore an object of the present invention to provide a display monitor power supply apparatus which has a simplified circuit construction.

It is also an object to provide a display monitor power supply apparatus with a power factor correction circuit.

These and other objects of the present invention can be achieved by a display monitor power supply apparatus for power supply to a display monitor which includes a power factor correction circuit coupled to receive a primary voltage, for correcting a power factor of said primary voltage and generating a secondary voltage; a switch operable in response to a pulse signal; a switch control circuit for generating said pulse signal; a transformer including a primary winding and secondary windings connected to each other by mutual induction, in which the primary winding has a first terminal coupled to receive the secondary voltage and a second terminal connected to the switch, and in which the transformer is being supplied with primary induced voltage when the pulse signal has a primary duty ratio and supplied with secondary induced voltage lower than the primary induced voltage when the pulse signal has a secondary duty ratio; a rectifier for rectifying the primary and secondary induced voltages; and a smoothing circuit for smoothing an output voltage of the rectifier for application to the power factor correction circuit.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
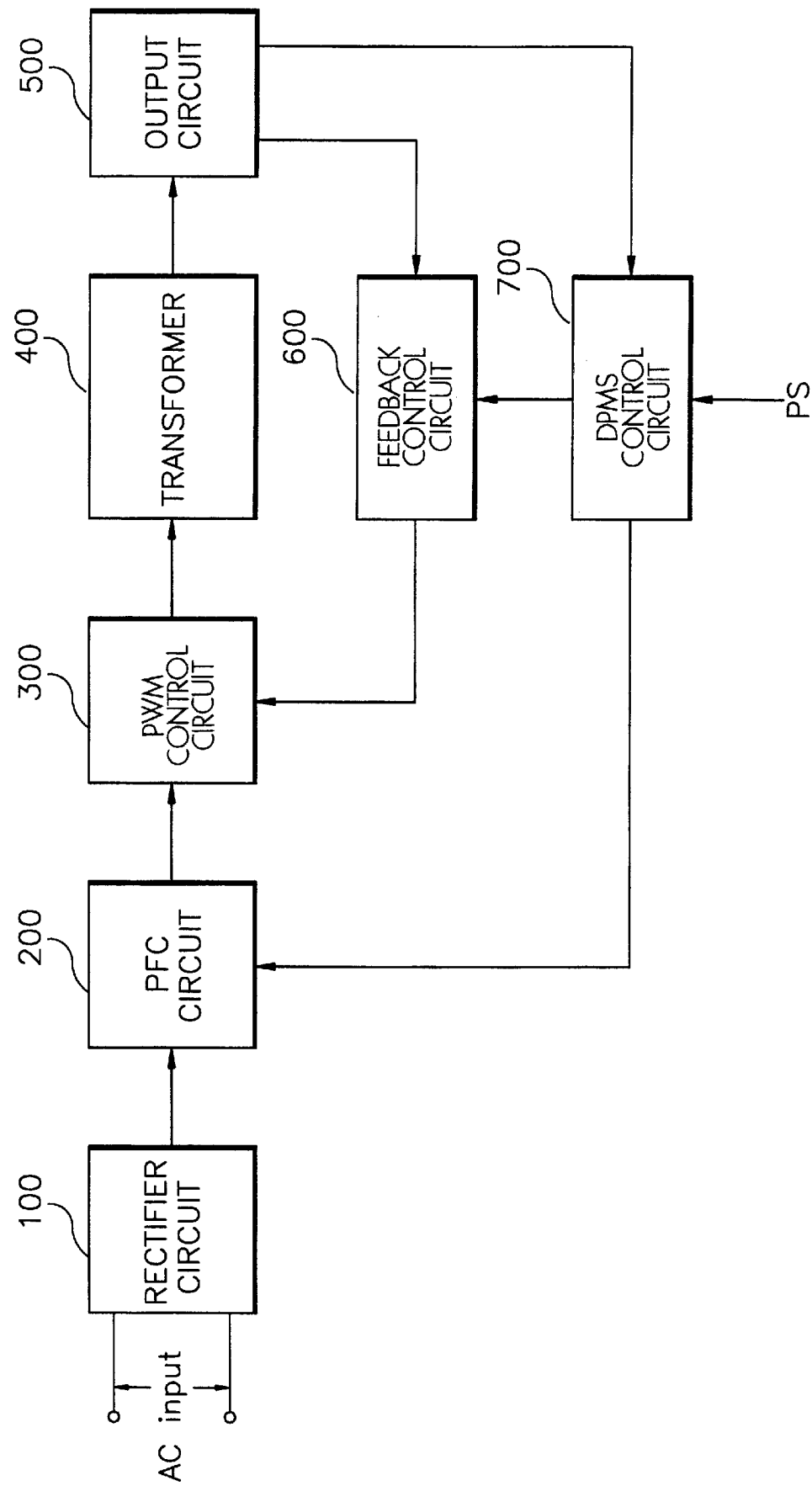
FIG. 1 is a block diagram of an exemplary power supply apparatus for a display monitor.

Referring now to the drawings and particularly to FIG. 1, which illustrates an exemplary power supply apparatus for a display monitor. This power supply apparatus includes a fullwave rectifier 100, a power factor correction (PFC) circuit 200, a pulse width modulation (PWM) control circuit 300, a transformer 400, an output circuit 500, a feedback control circuit 600 and a display power management signaling (DPMS) control circuit 700 for supporting operation the PFC circuit 200. Rectifier 100 is coupled to an AC input voltage to rectify the AC input voltage and generate a DC output voltage. PFC circuit 200 then performs power factor correction in response to an output of the DPMS control circuit 700. PWM control circuit 300 performs pulse width modulation of an output of the PFC circuit 200. Transformer 400 includes primary windings connected to receive an output of the PWM control circuit 300 and secondary windings connected to output circuit 500 which rectifies voltage signals induced by the respective windings and generates regulated voltages. The feedback control circuit 600 controls the feedback of the PWM control circuit 300, and the DPMS control circuit 700 controls DPMS functions in response to control signals from a personal computer PC.

Figure 2:
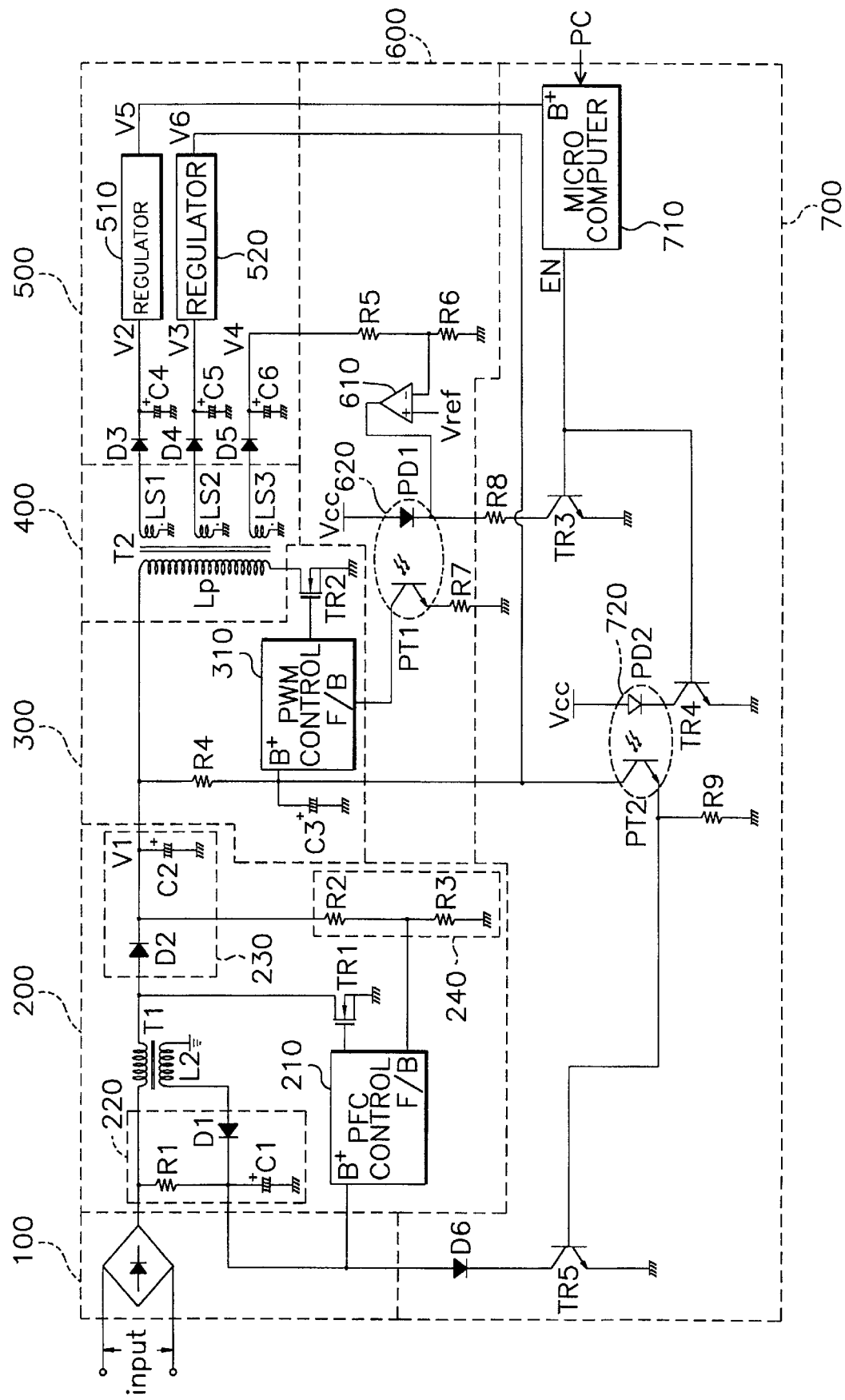
FIG. 2 is a detailed circuit diagram of the exemplary power supply apparatus as shown in FIG. 1.

FIG. 2 is a detailed circuit diagram of the exemplary power supply apparatus as shown in FIG. 1. The fullwave rectifier 100 includes a bridge diode circuit which receives an AC input voltage of about 90~260 [Volts]. The PFC circuit 200 includes a PFC controller 210, a switching transistor TR1, a PFC power supply 220 for providing a source voltage to the PFC controller 210, a booster transformer T1 for allowing the output voltage of the fullwave rectifier 100 to be boosted or increased to about 400 [Volts] according to the turning on/off of the switching transistor TR1, a rectifier 230 for rectifying the induced voltage, and a voltage divider 240 for regulating an output voltage changed according to the variation of the input voltage as well as load resistance. The power supply 220 includes a resistance R1, a diode D1 for rectifying a voltage induced by the secondary winding L2 of the booster transformer T1, and a capacitor C1 for smoothing the rectified voltage.

Both ends of the primary winding $L_P$ of the transformer 400 are connected to the PFC circuit 200 and the switching transistor TR2, respectively, and the secondary winding has three winding parts Ls1~Ls3 which are connected to the rectifiers within the output circuit 500. The winding Ls1 at the secondary side of the transformer 400 has the number of turns enough to provide a first induced voltage which is four times as high as the source voltage applied to a microcomputer 710. The winding Ls2 has the number of turns enough to provide a second induced voltage which is four times as high as the other source voltage applied to a PWM controller 310.

The display power management signaling power supply modes registered by the video electronics standard association (VESA) can be, as well-known in this art, classified into a normal mode, a standby mode, a suspend mode and a power-off mode. According to this DPMS system, power consumption of a 17 inch display monitor is about 90 [Watts] during normal mode, and about 8 [Watts] during power-off mode.

The DPMS control circuit 700 functions as a circuit for controlling all the DPMS power supply modes in response to information from a personal computer, and includes a microcomputer 710, a photocoupler 720, transistors TR3–TR5, a diode D6 and resistances R8 and R9. The microcomputer 710 generates a control signal CS of low level under control of the personal computer PC during the normal mode and generates a control signal of high level during the power-off mode. During the normal mode, the PFC circuit 200 operates with a direct voltage from the fullwave rectifier circuit 100 and generates a DC voltage of about 400 [V]. And then, by this DC voltage, a main power supply circuitry can be normally operated which comprises the PWM control circuit 300, the transformer 400, the output circuit 500 and the feedback control circuit 600. At this mode, the induced voltages from the winding parts Ls1~Ls3 at the secondary winding of the transformer 400 are applied to the components of the display monitor.

During the power-off mode, however, when the information regarding the start point of the power-off mode is provided from the personal computer PC, the microcomputer 710 in the display monitor outputs a control signal CS of high level so that transistors TR3 and TR4 are simultaneously turned on. Then, the feedback current flowing to the feedback terminal F/B of the PWM controller 310 during the power-off mode is increased in amount more than that during the normal mode, and thereby the duty ratio of the output pulse generated from the PWM controller 310 is greatly decreased as compared with that during the normal mode. As a result, each voltage which is induced from the secondary winding of the transformer 400 is greatly reduced to, for example, about one quarter of the voltage induced during the normal mode. The induced voltages from the outputs V5 and V6 of the regulators 510 and 520 are maintained at the voltages of 5V and 12V, respectively. Also when the transistor TR4 is turned on, a current flows through a photodiode PD2 so that a phototransistor PT2 can be turned on. The transistor TR5 is then turned on, so that a supply voltage to the PFC controller 210 is intercepted. As a result, the PFC circuit 200 does not operate during the power-off mode.

As described above, in addition to the a power supply section 220 of the PFC controller 210, the exemplary power supply apparatus is provided with the power-off circuit, which is constituted by the photocoupler 720, the transistors TR4 and TR5, the diode D6 and the resistor R9 as shown in FIG. 2. This power-off circuit is provided to prevent a supply voltage from being supplied to the PFC controller 210 during the power-off mode, which results in increase of the production cost. In addition, the PFC controller 210 permits the output voltage V1 of the PFC circuit 200 to be regulated by means of a voltage divider circuit 240, which results in poor regulation of the supply voltage B+ that is generated from the power supply circuit 220 and provided for PFC controller 210. This is because the supply voltage B+ is changed according to the fluctuation of the input voltage of the controller 210 as well as load variation.

Figure 3:
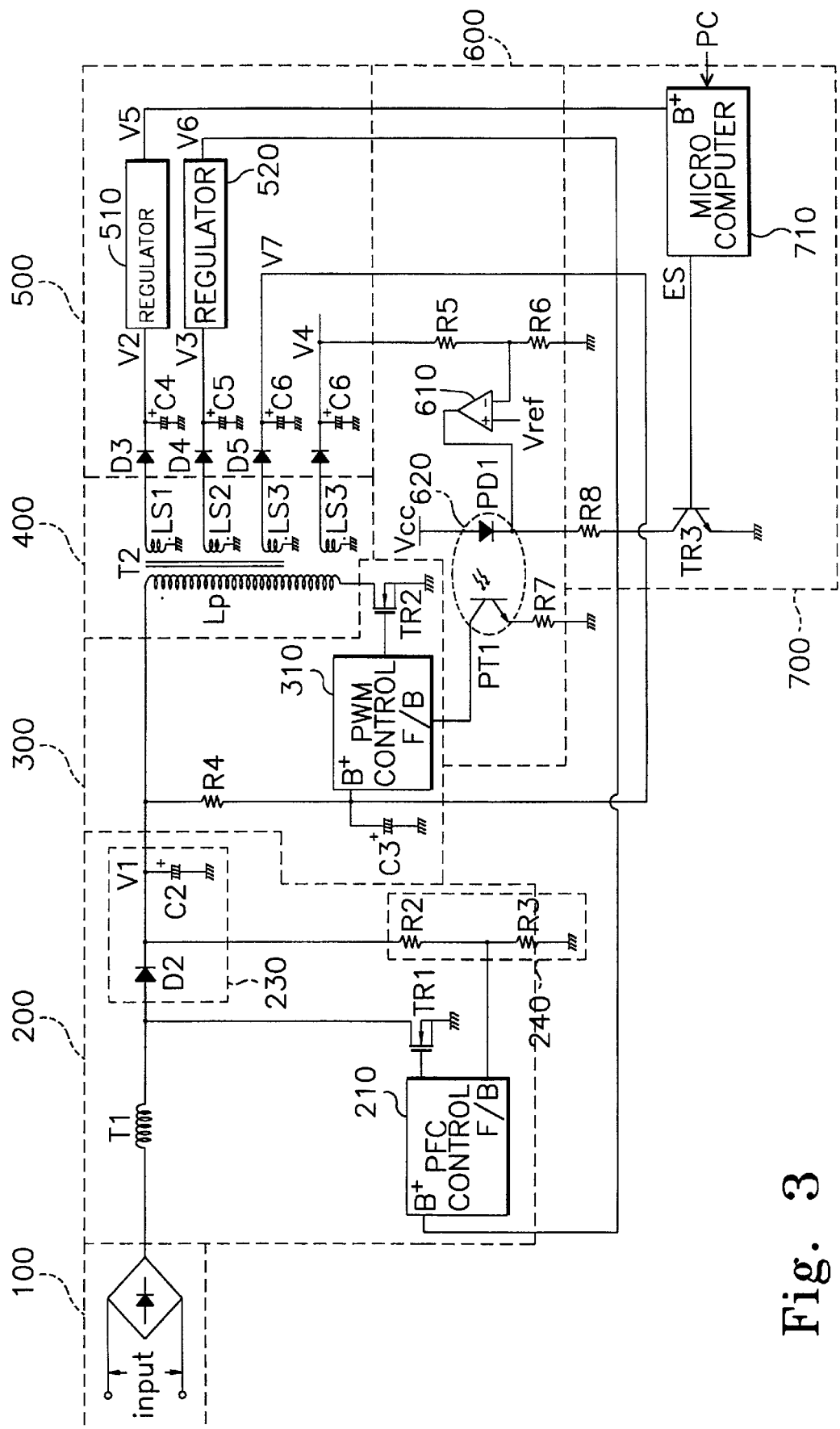
FIG. 3 is a circuit diagram of a display monitor power supply apparatus having a power factor correction circuit constructed according to a preferred embodiment of the present invention.

Turning now to FIG. 3, which illustrates a novel display monitor power supply apparatus constructed according to the principles of the present invention. The novel display monitor power supply apparatus includes a power factor correction (PFC) controller 210 whose source voltage is supplied directly to the primary winding of a transformer 400. The secondary windings include four winding parts Ls1~Ls4 which are connected to the rectifiers.

As shown in FIG. 3, during a power-off mode of the power supply apparatus, when voltages induced from the secondary windings of the transformer 400 are lowered to be one quarter of the induced voltages at a normal mode, the PFC controller 210 is supplied with a voltage lower than a source voltage necessary for a normal operation thereof, so that the PFC circuit 200 does not operate.

PFC circuit 200 includes the PFC controller 210, a switching transistor TR1, a booster transformer T1 for boosting the output voltage of the fullwave rectifier 100 to about 400 [Volts] according to the ON/OFF of the switching transistor TR1, a rectifier 230 for rectifying the induced voltage from the booster transformer T1, and a voltage divider 240 for regulating the output voltage of the PFC circuit 200 in accordance with the fluctuation of the input voltage of the PFC controller 210 as well as load variation.

PWM control circuit 300 includes a pulse width modulation (PWM) controller 310, a switching transistor TR2, a resistance R4 for supplying a source voltage of, for example, about 12 [Volts] to the PWM controller 310 while the PWM controller 310 is at a start mode thereof, and a capacitor C3.

The primary winding Lp of the transformer 400 is connected between the PFC circuit 200 and the switching transistor TR2 and the windings Ls1~Ls4 thereof are connected to the rectifiers each which is composed of a resistor and a diode in the output circuit 500. The winding part Ls1 at the secondary side of the transformer 400 has the number of turns enough to provide a first induced voltage V2 which is four times as high as a first source voltage applied to a microcomputer 710 and the winding part Ls2 has the number of turns enough to provide a second induced voltage V3 which is four times as high as a second source voltage applied to the PWM controller 310. An induced voltage through the winding part Ls4 of the transformer 400 is provided to the PFC controller 210 through a rectifier composed of a diode D7 and a capacitor C7.

Output circuit 500 connected with the secondary windings of the transformer 400 generates a variety of voltages such as 5, 8, 13, 25, 50, 90 and 190 [Volts], etc. Those voltages from the output circuit 500 are used to power the operation of the display monitor. For example, the induced voltage through the winding part Ls1 is applied to the regulator 510 through the rectifier composed of a diode D3 and a capacitor C4. The regulator 510 generates a voltage of 5 [Volts] to be provided to the microcomputer 710. The induced voltage through the winding part Ls2 is applied to the regulator 520 through the rectifier composed of a diode D4 and a capacitor C5. The regulator 520 generates a voltage to be provided to the PWM controller 310 during the normal mode.

Feedback control circuit 600 is provided to control a feedback current of the PWM controller 310 in accordance with a variation of the induced voltage from the winding part Ls3. The feedback control circuit 600 receives a voltage V4 from the rectifier which is connected with the winding part Ls3 and composed of a diode D5 and a capacitor C6 to allow the feedback current flow to a feedback terminal F/B of the PWM controller 310. The voltage V4 from the rectifier is divided by resistors R5 and R6 which are serially connected with each other and then the divided voltage is applied to a comparator 610. The divided voltage is compared with a reference voltage by means of the comparator 610. The feedback current flowing through a photocoupler 620 to the PWM controller 310 may be varied in amount according to the comparison result of the comparator. If the divided voltage is less than the reference voltage, the comparator 610 generates a high level signal. If the divided voltage is not less than the reference voltage, the comparator 610 generates a low level signal.

In case the voltage V4 is increased above a constant voltage, the output level of the comparator 610 drops down so that a current signal flowing through a photodiode PD1 is increased in amount. As a result, the feedback current flowing through a phototransistor PT1 to the PWM controller 310 is increased in amount and a duty ratio of the output pulse of the PWM controller 310 is reduced. Therefore the induced voltage from the winding part Ls3 can be controlled.

In addition to the microcomputer 710, the DPMS control circuit includes a transistor TR3 and a resistor R8. The microcomputer 710 generates a control signal CS in response to the information regarding a power saving mode from the personal computer PC. If the power supply apparatus is at a normal mode, the microcomputer 710 generates a control signal of low level. Likewise, if the power supply apparatus is at a power-off mode, the microcomputer 710 generates a control signal of high level.

First, during a normal mode, an externally applied AC (alternative current) voltage is converted into a rectified voltage by means of a fullwave rectifier 100. This rectified voltage is applied through the boosting transformer T1 to the rectifier 230 and then charged in the capacitor C2 of the rectifier 230. If the capacitor C2 is fully charged, it has a charged voltage V1 of about 400 [Volts]. The voltage V1 is applied through the resistor R4 to the source B+ of the PWM controller 310 and at the same time to the first winding of the transformer 400. If the voltage V1 is increased to be equal to the source voltage of the PWM controller 310, the PWM control circuit 300 starts to operate. Then the PWM controller 310 generates a pulse signal to make the switching transistor TR2 be switched. According to the switching of the transistor TR2, an energy is transmitted from the primary winding Lp of the transformer 400 to the secondary windings Ls1~Ls4. Supposing that the source voltages of the microcomputer 710 and the PWM controller 310 are 5 [Volts] and 12 [Volts], respectively, the induced voltages V2 and V3 from the winding parts Ls1 and Ls2 become about 20 [Volts] and 50 [Volts], respectively. This is because each of the winding parts Ls1 and Ls2 has the number of turns enough to obtain the induced voltage being about 4 times as high as the source voltage.

At an early state of the normal mode, the PFC circuit 200 does not operate at all. However, if the PWM control circuit 300 starts to operate and an energy is transmitted from the primary winding Lp to the secondary winding part Ls4, an induced voltage V7 from the winding part Ls4 is applied to the PFC controller 210. The winding part Ls4 has the number of turns enough to obtain the induced voltage V7 equal to the source voltage of the PFC controller 210. Thus, if the source voltage of the PFC controller 210 is 12 [V], the induced voltage V7 of the winding part Ls4 becomes about 12 [Volts]. Accordingly, when the PFC circuit 200 starts to operate and generates the output voltage V1 of about 400 [Volts].

Next, during a power-off mode, when the information indicative of a power-off mode are provided from the personal computer, the microcomputer 710 generates a control signal of high level and then the transistor TR3 is turned on in response to the high level control signal. Then the feedback current flowing to the PWM controller 310 is increased in amount so that the duty ratio of the output pulse thereof is more greatly reduced during the power-off mode than during the normal mode. As a result, each of the induced voltages from the secondary winding parts of the transformer 400 is decreased to about one quarter of each of the induced voltages at a normal mode. At this time, since the winding parts Ls1 and Ls2 have the number of turns enough to obtain the induced voltages being about 4 times as high as the source voltages of the microcomputer 710 and the PWM controller 310, respectively, the induced voltages V5 and V6 from the secondary winding parts Ls1 and Ls2 are maintained to be about 5 [Volts] and 12 [Volts], respectively. Accordingly, the microcomputer 710 and the PWM controller 310 can be normally operated.

However, because the secondary winding part Ls4 has the number of turns enough to obtain the induced voltage equal to the source voltage of the PFC controller 210, the induced voltage V7 of the secondary winding part Ls4 is rendered to be about 3 [Volts] and thereby the operation of the PFC controller 210 is interrupted. Also during the power-off mode, most of components besides the PWM controller 310 and the microcomputer 710 are stopped.

As described above, a power supply apparatus according to the present invention does not require additional circuitry for a DPMS circuit for controlling a power factor correction circuit, and thereby has a simplified power supply for the power factor correction circuit. As a result, production cost of the power supply apparatus may be reduced.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A power supply apparatus for a display monitor, comprising:

a power factor correction circuit coupled to receive a primary voltage, for correcting a power factor of said primary voltage and generating a secondary voltage;

a switch operable in response to a pulse signal;

a switch control circuit, said switch control circuit including a pulse width modulation controller for generating said pulse signal;

a transformer including a primary winding and a plurality of secondary windings connected to each other by mutual induction, said primary winding having a first terminal coupled to receive said secondary voltage and having a second terminal connected to said switch, said transformer for supplying primary induced voltage when said pulse signal has a primary duty ratio for a normal mode of operation of said power supply apparatus and for supplying secondary induced voltage lower than said primary induced voltage when said pulse signal has a secondary duty ratio for a power saving mode of operation of said power supply apparatus, wherein said power factor correction circuit receives an induced voltage from a winding out of said plurality of secondary windings, and wherein an induced voltage received by said power factor correction circuit for said power saving mode is less than an induced voltage received by said power factor correction circuit for said normal mode of operation;

rectifier circuitry for rectifying said primary induced voltage and said secondary induced voltage; and smoothing circuitry for smoothing an output voltage of said rectifier circuitry for application to said power factor correction circuit.

2. The power supply apparatus of claim 1, wherein said pulse signal has a duty ratio corresponding to a change of a third induced voltage produced from a winding out of said plurality of secondary windings.

3. The power supply apparatus of claim 2, further comprising a constant voltage supply for receiving a fourth induced voltage from another winding out of said plurality of secondary windings and for supplying a third voltage to said pulse width modulation controller equal to a source voltage of said pulse width modulation controller.

4. A power supply apparatus for a display monitor, comprising:

a power factor correction circuit coupled to receive a primary voltage, for correcting a power factor of said primary voltage and generating a secondary voltage;

a switch operable in response to a pulse signal;

a switch control circuit, said switch control circuit including a pulse width modulation controller for generating said pulse signal;

a transformer including a primary winding and a plurality of secondary windings connected to each other by mutual induction, said primary winding having a first terminal coupled to receive said secondary voltage and having a second terminal connected to said switch, said transformer for supplying primary induced voltage when said pulse signal has a primary duty ratio for a normal mode of operation of said power supply apparatus and for supplying secondary induced voltage lower than said primary induced voltage when said pulse signal has a secondary duty ratio for a power saving mode of operation of said power supply apparatus, wherein said pulse signal has a duty ratio corresponding to a change of a third induced voltage produced from a winding out of said plurality of secondary windings; and further wherein said power factor correction circuit receives an induced voltage from a winding out of said plurality of secondary windings, and wherein an induced voltage received by said power factor correction circuit for said power saving mode is less than an induced voltage received by said power factor correction circuit for said normal mode of operation; a constant voltage supply for receiving a fourth induced voltage from another winding out of said plurality of secondary windings and for supplying a third voltage to said pulse width modulation controller equal to a source voltage of said pulse width modulation controller, wherein said another winding out of said plurality of secondary windings producing said fourth induced voltage has a number of turns enough to supply an induced voltage four times as high as said third voltage when said pulse signal has the primary duty ratio, and has the number of turns enough to supply an induced voltage equal to said third voltage when said pulse signal has said secondary duty ratio;

rectifier circuitry for rectifying said primary induced voltage and said secondary induced voltage; and smoothing circuitry for smoothing an output voltage of said rectifier circuitry for application to said power factor correction circuit.

* * * * *

UNITED STATES PATENT AND TRADEMARK OFFICE
CERTIFICATE OF CORRECTION

PATENT NO.    : 5,905,491
DATED         : May 18, 1999
INVENTOR(S)   : Hong-Ki Kim It is certified that error appears in the above-identified patent and that said Letters Patent is hereby corrected as shown below:

Title page,
The Title page showing an illustrative figure should be deleted and substitute therefore the attached title page.

Drawings,
Figures 1, 2 and 3, should be deleted and replaced so as to appear as per the attached drawings for Figures 1, 2 and 3.

Column 4,
Line 67, change "diode D7" to -- diode D6 --;

Column 5,
Line 44, change "signal CS" to -- signal ES --; and
Line 52, change "(alternative current)" to -- (alternating current) --.

United States Patent [19]

Kim

[11] Patent Number: 5,905,491

[45] Date of Patent: May 18, 1999

[54] DISPLAY MONITOR POWER SUPPLY APPARATUS WITH A POWER FACTOR CORRECTION CIRCUIT

[75] Inventor: Hong-Ki Kim, Kyungki-do, Rep. of Korea

[73] Assignee: SamSung Electronics Co., Ltd., Suwon, Rep. of Korea

[21] Appl. No.: 08/829,677

[22] Filed: Mar. 31, 1997

[30] Foreign Application Priority Data

Mar. 29, 1996 [KR] Rep. of Korea ............... 96-9317

[51] Int. Cl.$^6$ ..................................... G09G 5/00
[52] U.S. Cl. .................. 345/212; 363/41; 395/750.04
[58] Field of Search ..................... 345/10, 11, 211, 345/212, 213; 395/750.03, 750.04, 750.08; 363/41, 21, 95, 97

[56] References Cited

U.S. PATENT DOCUMENTS

| | | |
|---|---|---|
| 4,669,036 | 5/1987 | Cowett, Jr. .................. 363/21 |
| 4,886,979 | 12/1989 | Chang . |
| 5,019,717 | 5/1991 | McCurry et al. . |
| 5,335,168 | 8/1994 | Walker . |
| 5,375,245 | 12/1994 | Solhjell et al. . |
| 5,481,730 | 1/1996 | Brown et al. . |
| 5,481,732 | 1/1996 | Shahbazi . |
| 5,483,464 | 1/1996 | Song .................. 364/492 |
| 5,734,562 | 3/1998 | Redl .................. 363/16 |

*Primary Examiner*—Steven J. Saras
*Assistant Examiner*—John G. Lim
*Attorney, Agent, or Firm*—Robert E. Bushnell, Esq.

[57] ABSTRACT

A power supply apparatus for a display monitor includes a power factor correction circuit coupled to receive a primary voltage, for correcting a power factor of said primary voltage and generating a secondary voltage; a switch operable in response to a pulse signal; a switch control circuit for generating said pulse signal; a transformer including a primary winding and secondary windings connected to each other by mutual induction, in which the primary winding has a first terminal coupled to receive the secondary voltage and a second terminal connected to the switch, and in which the transformer is being supplied with primary induced voltage when the pulse signal has a primary duty ratio and supplied with secondary induced voltage lower than the primary induced voltage when the pulse signal has a secondary duty ratio; a rectifier for rectifying the primary and secondary induced voltages; and a smoothing circuit for smoothing an output voltage of the rectifier for application to the power factor correction circuit.

4 Claims, 3 Drawing Sheets

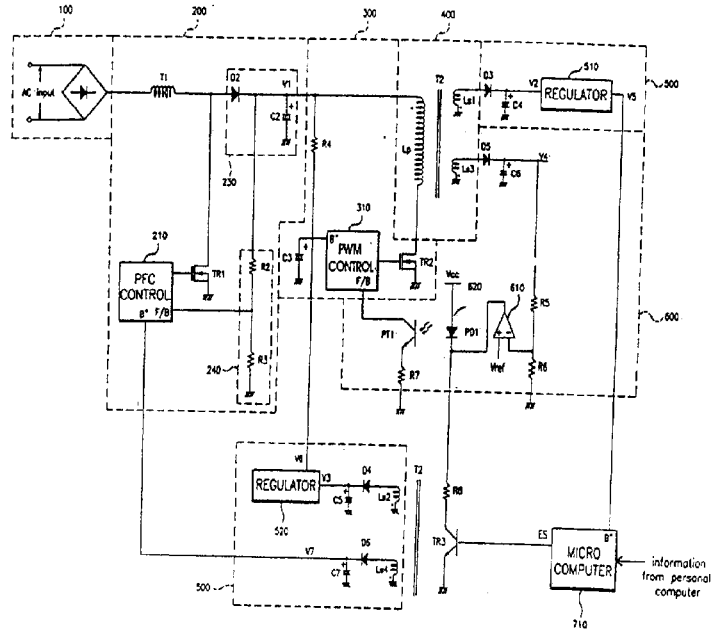

UNITED STATES PATENT AND TRADEMARK OFFICE
CERTIFICATE OF CORRECTION

PATENT NO.   : 5,905,491
DATED        : May 18, 1999
INVENTOR(S)  : Hong-Ki Kim

It is certified that error appears in the above-identified patent and that said Letters Patent is hereby corrected as shown below:

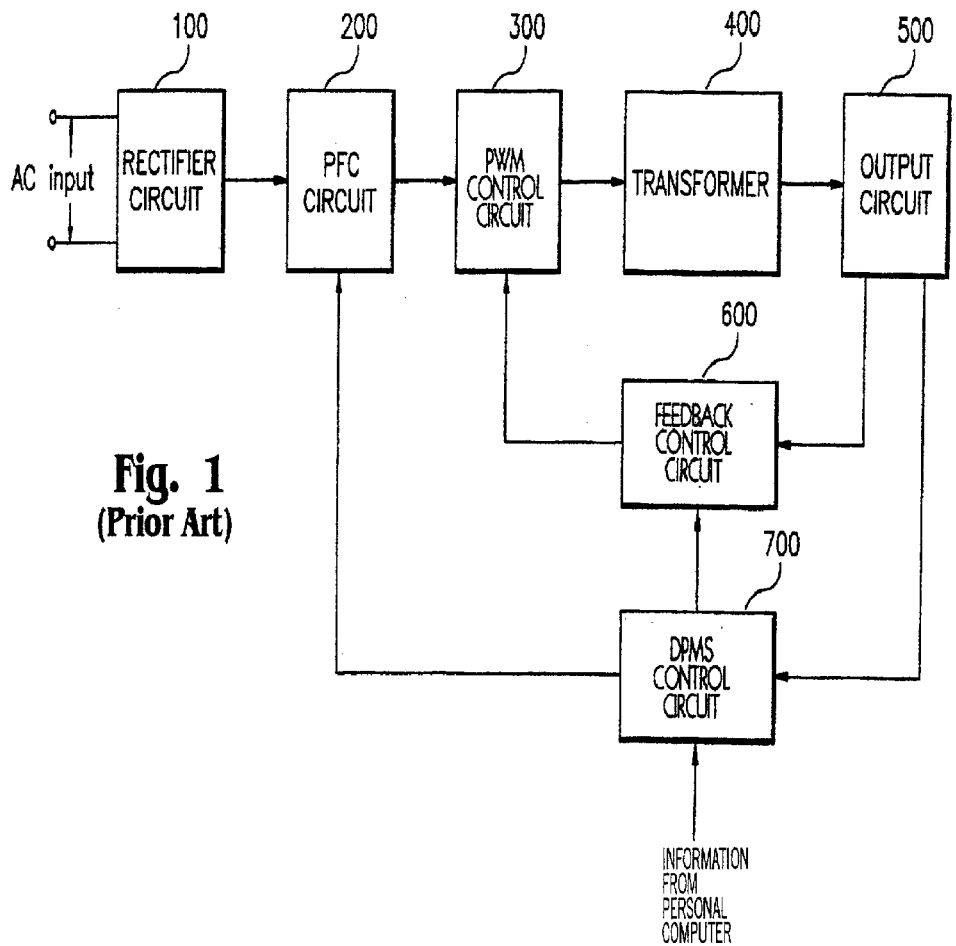

Fig. 1
(Prior Art)

UNITED STATES PATENT AND TRADEMARK OFFICE
CERTIFICATE OF CORRECTION

PATENT NO.    : 5,905,491
DATED         : May 18, 1999
INVENTOR(S)   : Hong-Ki Kim It is certified that error appears in the above-identified patent and that said Letters Patent is hereby corrected as shown below:

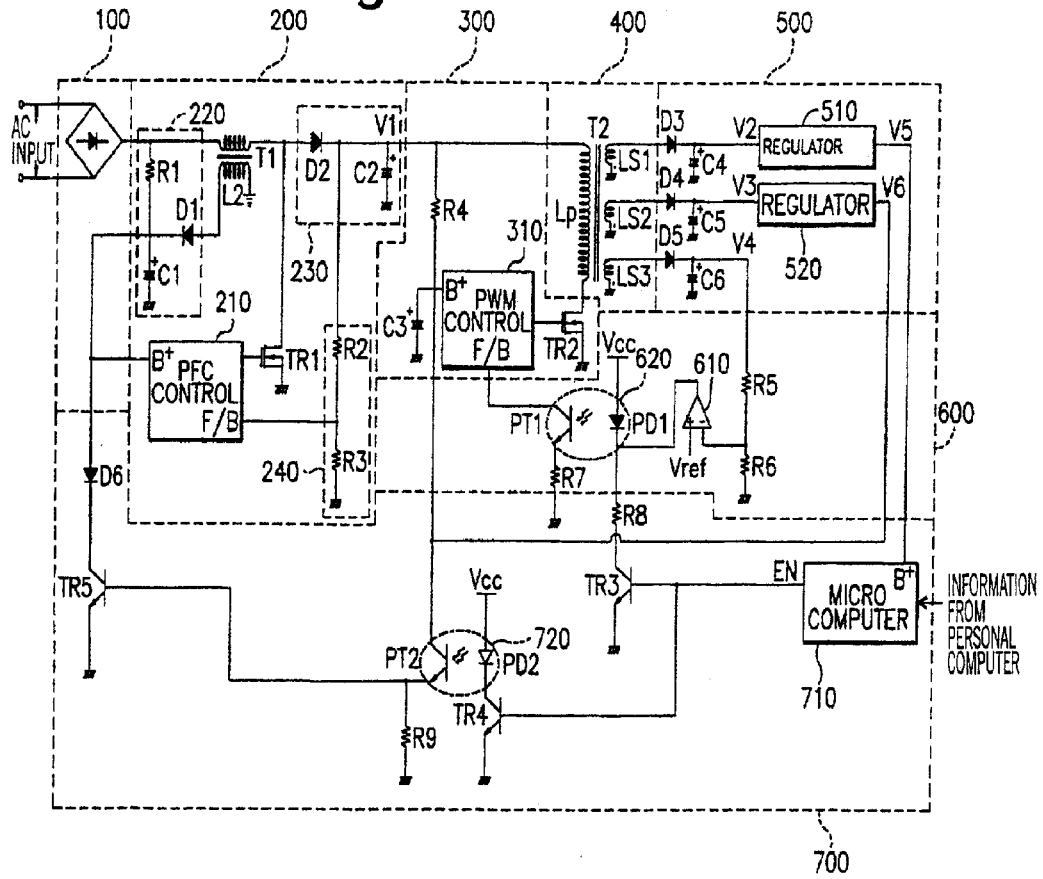

Fig. 2(Prior Art)

UNITED STATES PATENT AND TRADEMARK OFFICE
CERTIFICATE OF CORRECTION

PATENT NO.    : 5,905,491
DATED         : May 18, 1999
INVENTOR(S)   : Hong-Ki Kim It is certified that error appears in the above-identified patent and that said Letters Patent is hereby corrected as shown below:

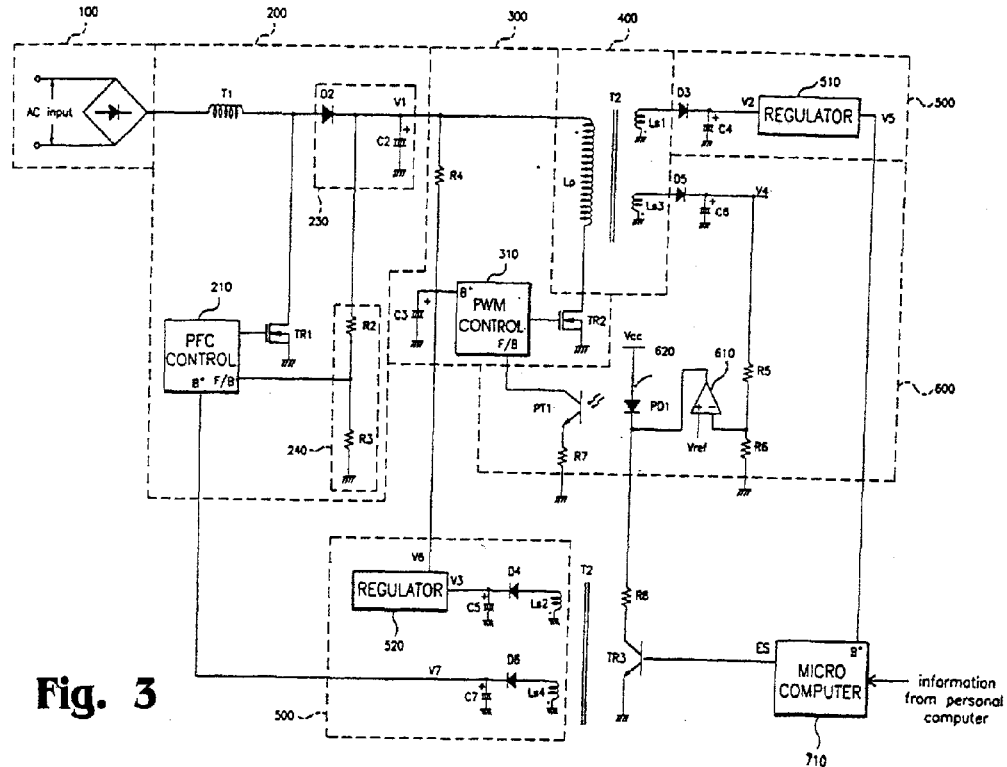

Fig. 3

Signed and Sealed this

Sixth Day of August, 2002

*Attest:*

*Attesting Officer*

JAMES E. ROGAN
*Director of the United States Patent and Trademark Office*